(12) United States Patent
Kim et al.

(10) Patent No.: US 8,929,545 B2
(45) Date of Patent: Jan. 6, 2015

(54) SURVEILLANCE VIDEO TRANSMISSION APPARATUS AND METHOD AND SURVEILLANCE VIDEO RECEIVING APPARATUS AND METHOD

(71) Applicant: Electronics and Telecommunications Research Institute, Daejeon (KR)

(72) Inventors: Young Sae Kim, Daejeon (KR); Jin Hee Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 99 days.

(21) Appl. No.: 13/705,065

(22) Filed: Dec. 4, 2012

(65) Prior Publication Data

US 2013/0156185 A1   Jun. 20, 2013

(30) Foreign Application Priority Data

Dec. 14, 2011   (KR) ........................ 10-2011-0134150

(51) Int. Cl.
*H04N 7/167* (2011.01)
*H04L 9/08* (2006.01)
*H04N 5/913* (2006.01)
*H04N 7/18* (2006.01)
*H04N 5/77* (2006.01)
*G08B 13/196* (2006.01)

(52) U.S. Cl.
CPC .................. *H04L 9/08* (2013.01); *H04N 5/913* (2013.01); *H04N 7/181* (2013.01); *H04N 2005/91364* (2013.01); *G08B 13/19652* (2013.01); *G08B 13/19667* (2013.01); *H04N 5/77* (2013.01); *G08B 13/19686* (2013.01)

USPC ......................................................... 380/210

(58) Field of Classification Search
CPC .................................. H04N 7/16; H04N 7/18
USPC ............................................ 380/210; 726/26
See application file for complete search history.

(56) References Cited

U.S. PATENT DOCUMENTS

| 2004/0085445 | A1* | 5/2004 | Park ............................... 348/143 |
| 2006/0137018 | A1* | 6/2006 | Herschaft ....................... 726/26 |
| 2007/0296817 | A1* | 12/2007 | Ebrahimi et al. ............. 348/161 |
| 2011/0150327 | A1 | 6/2011 | Yoo et al. |

FOREIGN PATENT DOCUMENTS

| KR | 10-2007-0013550 A | 1/2007 |
| KR | 10-2011-0070735 A | 6/2011 |

* cited by examiner

*Primary Examiner* — Teshome Hailu
*Assistant Examiner* — Thanh Le

(57) ABSTRACT

A surveillance video transmission apparatus, includes a video input unit configured to collect physical videos and make the collected physical videos informative; a video analysis unit configured to analyze content of the collected video by recognizing the collected video and detecting an event; and an encryption selection unit configured to select one of a non-encryption mode, a regions-of-interest encryption mode and a full video encryption mode based on the analysis result of the collected video. Further, the surveillance video transmission apparatus includes a video process unit configured to perform one of a non-encryption, a regions-of-interest encryption and a full video encryption and encoding on the collected video according to the selected encryption mode; and a video transmission unit configured to transmit the encoded video and encryption-related information to a surveillance video receiving apparatus.

20 Claims, 5 Drawing Sheets

SURVEILLANCE VIDEO TRANSMISSION APPARATUS AND METHOD AND SURVEILLANCE VIDEO RECEIVING APPARATUS AND METHOD

CROSS-REFERENCE TO RELATED APPLICATIONS

The present invention claims priority of Korean Patent Application No. 10-2011-0134150, filed on Dec. 14, 2011, which is incorporated herein by reference.

FIELD OF THE INVENTION

The present invention relates to techniques for securely processing video collected by cameras; more particularly, to the surveillance video transmission apparatus and method, which are suitable for selectively encrypting collected video generated in a video surveillance system according to the content of video and transmitting the encrypted video, and to surveillance video receiving apparatus and method which are suitable for receiving and decrypting the selectively encrypted video.

BACKGROUND OF THE INVENTION

In general, a video surveillance system called as a CCTV (Closed Circuit Television) uses at least one camera. Such a video surveillance system has been employed in a variety of fields for surveillance and security. Recently, the existing analog surveillance cameras are being replaced by high performance digital network cameras of a high performance to which a video compression technology is applied. Moreover, an intelligent camera further including video recognition and event detection functions are on the rise as a next-generation camera. As such, the technical development of surveillance cameras becomes a major issue in the related fields.

Such functional sophistication of the video surveillance system causes side effects to become social problems. Among the social problems, it is a typical problem that personal (or private) information is revealed. Actually, videos of a CCTV within a special district are being originally provided to users by several portal sites without filtering characters in the videos. As a result, it is disclosed the private information regarding whereabouts of an individual in a specific time band. Due to this, the privacy of individuals may be violated.

In order to prevent the problem described above, it is necessary for the video surveillance system to employ an encryption function which encrypts real-time surveillance video to transmit same and allows only an authorized person to watch the encrypted real-time surveillance videos using a decryption key. Such an encryption function may be applied to the video surveillance system in two methods.

First, the whole of an video can be encrypted. This full video encryption scheme enables the video itself to be not recognized visually without decryption. Alternatively, regions-of-interest (ROI) encryption scheme called as privacy masking can be used. The ROI encryption scheme extracts and encrypts regions, which are capable of violating individual privacy such as the face of a person, from a video using a video recognition algorithm possible to recognize the face of a person.

In the former, the entirely encrypted video may cause some problems. Actually, a control center generally divides video monitoring personnel into authorized personnel capable of watching normal videos and unauthorized personnel who performs monitoring limited videos. In this case, it is unnecessary for the unauthorized personnel to perform monitoring the limited videos because the limited videos itself is not identified. Further, in case existent information such as geographic information or traffic information needs to be provided to general users through videos, the entirely encrypted videos can prevent the exposure of personal information but cause information not to be provided. Moreover, if full video encryption is continuously performed in the system for a long time, resources of the system may be wasted to encrypt even unimportant information.

Because of such a property of the video information, only a desired region within a video is generally encrypted by the latter one of the above-mentioned two encryption schemes to be transmitted. Further, an authorized person of the receiving side can generally decrypt and identify the partially encrypted video when a specific event occurs and it is necessary to distinguish a private person related to the specific event. In other words, only desired information is encrypted depending on the content of a video.

However, a serious problem may be overlooked in the current methods even though the video is encrypted depending on the content of the video. Specifically, a part of the video which includes a factor capable of invading individual privacy can be screened for a person exposed to the video, but other persons watching such a partially screened video cannot be considered.

For example, a video including a violent or abhorrent event such as a violent incident, a special theft, a sexual offense, a throwing/burning oneself to death, a human/vehicle accident or other can force a person watching the video to receive regardless of her/his intent and furthermore undergo a considerable psychological impact. Actually, in recent, a violent incident video is broadcasted without filtration through a news channel and arouses a strong storm of public criticism.

Of course, broadcast content providers or web-based VoD (Video-on-Demand) services may previously shield the above-mentioned harmful video information. However, the video surveillance system transmitting and receiving videos in real time can always cause a leakage of such harmful video information. If an encryption scheme for protecting only personal information is applied to the video surveillance system, the privacy of a person taking any action can be protected by the encrypted video, but the action itself must be exposed to other persons. Moreover, if the above-mentioned action is harmful to other persons, it is necessary to prevent a video with such an action from being identified by other persons.

SUMMARY OF THE INVENTION

In view of the above, the present invention provides an efficient encryption scheme for a video surveillance system that is suitable for protecting personal information and preventing harmful video information by selectively performing a regions-of-interest encryption and a full video encryption for a video on the basis of the content of the video.

In accordance with a first aspect of the present invention, there is provided a surveillance video transmission apparatus, including: a video input unit configured to collect physical videos and make the collected physical videos informative; a video analysis unit configured to analyze content of the collected video by recognizing the collected video and detecting an event; an encryption selection unit configured to select one of a non-encryption mode, a regions-of-interest encryption mode and a full video encryption mode based on the analysis result of the collected video; a video process unit configured to perform one of a non-encryption, a regions-of-interest encryption and a full video encryption and encoding on the collected video according to the selected encryption mode; and a video transmission unit configured to transmit the encoded video and encryption-related information to a surveillance video receiving apparatus.

In accordance with a second aspect of the present invention, there is provided a method for transmitting surveillance video, including: analyzing content of a collected video by recognizing the collected video and detecting an event; selecting one of non-encryption mode, regions-of-interest encryption mode and full video encryption mode based on the analysis result of the collected video; performing a first video processing, which encodes the collected video, when the non-encryption mode is selected; performing a second video processing, which encrypts regions in the collected video corresponding to previously set regions-of-interest and encodes the collected video including the encrypted regions-of-interest, when the regions-of-interest encryption mode is selected; performing a third video processing procedure, which sequentially encrypts and encodes the whole of the collected video, when the full video encryption mode is selected; and transmitting the encoded video, which is obtained through one of the first through third video processing procedures, and encryption-related information to a surveillance video receiving apparatus.

In accordance with a third aspect of the present invention, there is provided a surveillance video receiving apparatus including: a video receiving unit configured to receive an encoded video and encryption-related information which are transmitted from a surveillance video transmission apparatus; a decryption selection unit configured to extract encryption mode selection information from the encryption-related information and select one of non-decryption mode, regions-of-interest decryption mode and full decryption mode on the basis of the extracted encryption mode selection information; and a video process unit configured to perform one of a non-decryption, a regions-of-interest decryption and a full decryption on the encoded video according to the selected decryption mode, and store or play the decoded video.

In accordance with a fourth aspect of the present invention, there is provided a method for receiving surveillance video, the method including: receiving an encoded video and encryption-related information which are transmitted from a surveillance video transmission apparatus; extracting encryption mode selection information from the encryption-related information and selecting one of non-decryption mode, regions-of-interest decryption mode and full decryption mode on the basis of the extracted encryption mode selection information; and performing a first video processing, which decodes the collected video, when the non-decryption mode is selected; performing a second video processing, which decodes the encoded video and decrypts regions-of-interest within the decoded video, when the regions-of-interest decryption mode is selected; performing a third video processing, which sequentially decodes and decrypts the whole of the encoded video, when the full video encryption mode is selected; and performing one of storing and playing on the decoded video obtained through one of the first to third video processing.

In accordance with an embodiment of the present invention, one of the non-encryption mode, the regions-of-interest encryption mode and the full video encryption mode may be selected on the basis of the analysis result of the content of a collected video which is obtained through the recognition of the collected video and the event detection. The selected encryption mode allows the collected video to be only encoded without encryption, the regions-of-interest in the collected video to be encrypted before encoding the collected video, or the whole of the collected video to be sequentially encrypted and encoded. Therefore, personal information may be protected, and harmful video information also may be prevented.

Further, the non-encryption mode, the partial (or regions-of-interest) encryption mode and the full video encryption mode are selectively transmitted to the collected video according to the content of the collected video. As a result, an unnecessary waste of system resources in operation of the video surveillance system may be efficiently prevented. Furthermore, the circumstances of an event may be intuitively recognized from the encrypted state of a video played in a control side.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

The technical subject matter of the present invention enables a surveillance video transmission apparatus to analyze content of a collected video through video recognition and event detection; select one of non-encryption mode, regions-of-interest encryption mode and full video encryption mode based on the analysis resultant of the collected video; encode the collected video with performing one of a non-encryption, a regions-of-interest encryption and a full video encryption according to the selected encryption mode; and transmit the encoded video, which is obtained through the encoding and encrypting processes, and encryption-related information to a surveillance video receiving apparatus. Also, the technical subject matter of the present invention forces a surveillance video receiving apparatus to: extract encryption mode selection information from encryption-related information received together with an encoded video; select one of a non-decryption mode, a regions-of-interest decryption mode and a full decryption mode on the basis of the extracted encryption mode selection information; decode the encoded video or with decrypting the regions-of-interest or the whole of the decoded video on the basis of the selected decryption mode; and perform one of storing and playing processes for the video obtained through the decoding and decrypting processes. Such technical means allows not only the objects of the present invention to be achieved but also the problems caused in those of the related art to be efficiently prevented.

The encryption-related information may include only encryption mode selection information when the non-encryption mode is selected. If the regions-of-interest encryption mode is selected, the encryption-related information may include encryption mode selection information, an encryption key and coordinates of the regions-of-interest. When the full video encryption mode is selected, the encryption-related information may include encryption mode selection information and an encryption key.

The regions-of-interest encryption means an encryption scheme extracting and encrypting only some region including personal information, such as the face of a person, from a video collected through a camera or others. In this case, a receiving side cannot recognize a part of the video including the personal information without decryption even though the rest of the video not including the personal information is recognized. Meanwhile, a full video encryption scheme encrypting the whole of a video obtained through a camera or others is used to prevent the whole of a video from being recognized by the receiving side.

Further, in the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings which form a part hereof.

Figure 1:
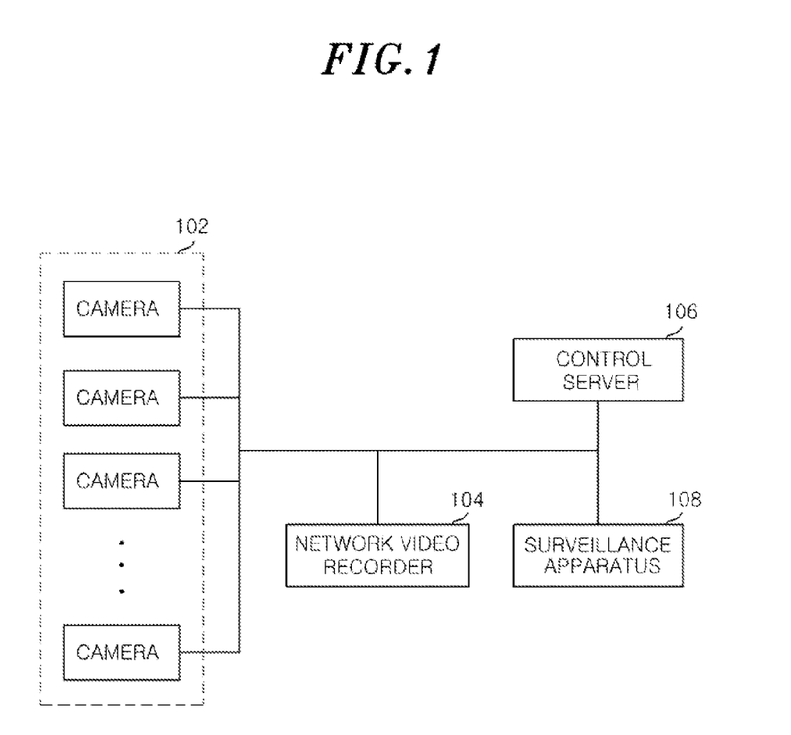
FIG. 1 is a block diagram showing the configuration of a typical video surveillance system to which embodiments of the present invention are applied.

FIG. 1 is a block diagram showing the configuration of a typical video surveillance system to which embodiments of the present invention are applied. The video surveillance system may include a camera group 102, a network video recorder 104, a control server 106, a surveillance device 108 and the like. The camera group 102 includes a plurality of cameras.

Referring to FIG. 1, each of the cameras within the camera group 102 captures a video of a specific area and transmits the captured videos to the network video recorder 104, the control server 106, the surveillance device 108 and the like. Further, each camera may change a capturing area by adjusting capturing angle thereof according to drive control signals (or commands) applied from the network video recorder 104, the control server 106 and the like.

The network video recorder 104 may store videos collected from the cameras, searches for the stored videos, and transmits the collected videos to other devices, for example the control server 106 or the surveillance device 106. Such a network video recorder 104 may further include a surveillance video transmission apparatus or both the surveillance video transmission and receiving apparatuses in accordance with embodiments of the present invention.

The control server 106 may monitor videos received from the cameras or the network video recorder 104. Further, the control server 106 can store the received videos into a storage medium and transmits the videos stored in the storage medium to the surveillance apparatus 108. Moreover, the control server 106 can analyze the received or stored videos using a variety of analysis schemes. Furthermore, the control server 106 can drive and control the cameras and the network video recorder 104. Such a control server 106 may include the surveillance video receiving apparatus in accordance with an embodiment of the present invention.

The surveillance apparatus 108 can monitor the videos transmitted from each camera, the network video recorder 104, or the control server 106. As a surveillance apparatus, a personal computer or a mobile appliance can be used. The mobile appliance may be a personal digital assistant such as a cellular phone, a smart phone, a smart pad, or others.

Figure 2:
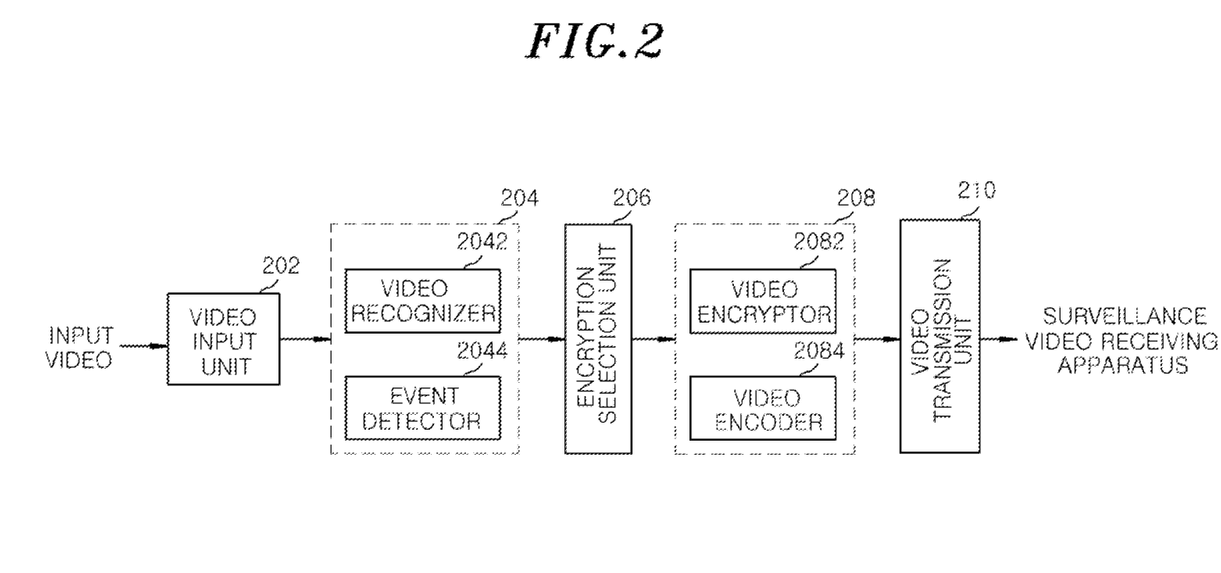
FIG. 2 is a block diagram showing the configuration of a surveillance video transmission apparatus in accordance with an embodiment of the present invention.

FIG. 2 is a block diagram showing the configuration of a surveillance video transmission apparatus in accordance with an embodiment of the present invention. The surveillance video transmission apparatus may include a video input unit 202, a video analysis unit 204, and an encryption selection unit 206, a video process unit 208, a video transmission unit 210. The video analysis unit 204 may include a video recognizer 2042 and an event detector 2044. The video process unit 208 may include a video encryptor 2082 and a video encoder 2084.

Referring to FIG. 2, the video input unit 202 may collect physical videos received from the cameras within the camera group 102 to make the collected physical videos informative. In order to make the collected videos informative, the video input unit 202 can convert an analog video signal obtained from a video sensor, such as a CCD (Charge Coupled Device), a CMOS video sensor, or others, into a digital video signal.

The video analysis unit 204 may analyze the content of the collected video applied from the video input unit 202. More specifically, the video analysis unit 204 can recognize the collected video and detect an event in the collected video. To this end, the video analysis unit 204 may include the video recognizer 2042 and the event detector 2044.

The video recognizer 2042 can recognize whether or not a region-of-interest exists in the collected video, i.e., a region regarding private information, such as the face of person, is in the collected video. If the region-of-interest is in the corrected video, the video recognizer 2042 can extract information about the region-of-interest, for example coordinate information of the region-of-interest. Also, the video recognizer 2042 can apply the information about the region-of-interest to the encryption selection unit 206 as an analysis resultant of the collected video.

The event detector 2044 can detect the generation of an event in the collected video using a back ground modeling algorithm, an object detection and tracking algorithm, an object feature parameter extraction algorithm, or others. If the detected resultant includes at least one of a harmful event, a violent event, an abhorrent event, a special theft, a sexual offense, violent crime and others, the event detector 2044 can generate event detection information corresponding to the detection resultant. The event detection information is applied to the encryption selection unit 206.

For example, the event detector 2044 may include an event detection module with learning ability. In this case, the event detector 2044 can detect a falling motion of a person, a violent action against someone, actions of unnaturally touching a person with the other sex, an action of sexually assaulting a person with the other sex, a motion of lifting articles with looking around, a motion of confidentially observing an exposed state of someone, a motion of threatening someone with an offensive weapon, and so on.

The encryption selection unit 206 can select one of encryption modes based on the analysis resultant of the collected video, such as the existence of regions-of-interest, the event detection information and so on, applied from the video analysis unit 204. The encryption modes may includes a non-encryption mode for allowing the collected video to be not encrypted, a regions-of-interest encryption mode for encrypting only the regions-of-interest within the collected video, and a full video encryption mode for encrypting the whole of the collected video. The selected encryption mode is applied from the encryption selection unit 206 to the video process unit 208. Further, the encryption mode selection information may indicate selected one of the non-encryption mode, the regions-of-interest encryption mode and the full video encryption mode. The regions-of-interest may include regions being related to the private (or personal) information such as the face of a person.

If the regions-of-interest do not exist in the collected video and any event is not generated, the encryption selection unit 206 can select the non-encryption mode for performing only an encoding process without encryption. When the regions-of-interest exist in the collected video and any event is not generated, the encryption selection unit 206 can select the regions-of-interest encryption mode for encrypting the previously defined regions-of-interest before the whole of the collected video is encoded. In case the generation of at least one event is detected in the collected video, the encryption selection unit 206 can select the full video encryption mode for sequentially performing encrypting and encoding processes for the whole of the collected video.

The video process unit 208 may perform only the encoding process or with encoding the regions-of-interest or the whole of the collected video, based on the encryption mode selection information applied from the encryption selection unit 206. In other words, the encryption mode selection information enables the video process unit 208 to encode the collected videos using one of H.264 and MPEG video encoding algorithms, to encrypt only the regions-of-interest before encoding the whole of the collected video provided with the encrypted regions-of-interest, or to sequentially perform the encrypting and encoding processes for the whole of the collected video. To this end, the video process unit 208 may include the video encryptor 2082 and the video encoder 2084.

The video encryptor 2082 may encrypt only the regions-of-interest according to the previously set encryption algorithm and apply the encrypted regions-of-interest and the coordinate information thereof to the video encoder 2084, when the encryption mode selection information applied from the encryption selection unit 206 indicates the regions-of-interest encryption mode. Meanwhile, if the encryption mode selection information applied from the encryption selection unit 206 indicates the full video encryption mode, the video encryptor 2082 can encrypt the whole of the collected video according to the previously set encryption algorithm and apply the fully encrypted video to the video encoder 2084.

The video encoder 2084 may encode the collected video, which is not encrypted, according to the previously set encoding algorithm, such as one of H.264 and MPEG video encoding algorithms, and apply the encoded video information and encryption-related information to the video transmission unit 210, when the encryption mode selection information applied from the encryption selection unit 206 indicates the non-encryption mode. If the encryption mode selection information applied from the encryption selection unit 206 indicates the regions-of-interest encryption mode, the video encoder 2084 can encode the collected video, which includes the encrypted regions-of-interest and is applied from the video encryptor 2082, and apply the encoded video information and the encryption-related information to the video transmission unit 210. When the encryption mode selection information applied from the encryption selection unit 206 indicates the full video encryption mode, the video encoder 2084 can encode the fully encrypted video applied from the video encryptor 2082 and apply the encoded video information and the encryption-related information to the video transmission unit 210.

The encryption-related information may include only the encryption mode selection information, in the non-encryption mode. In the regions-of-interest encryption mode, the encryption-related information may include the encryption mode selection information, an encryption key, coordinates of the regions-of-interest, such as a coordinate of someone's face, and so on. Further, in the full video encryption mode, the encryption-related information may include the encryption mode selection information, the encryption key and on the like.

The video transmission unit 210 may modulate the encoded video information which includes the encryption-related information and is applied from the video process unit 208, into a data format capable of being transmitted through network. Also, the video transmission unit 210 can transmit to the surveillance video receiving apparatus, for example the control server 106, through network.

In this manner, the surveillance video transmission apparatus analyzes the content of the collected video applied from the camera. According to the analysis resultant, the surveillance video transmission apparatus can allow the collected video to be encoded without encryption and transmitted to the secure video receiving apparatus, the collected video including the encrypted regions-of-interest to be encoded and then transmitted to the secure video receiving apparatus, or the entirely encrypted video to be encoded and transmitted to the secure video receiving apparatus.

Subsequently, processes of selectively encrypting a video according to the content thereof and transmitting the selectively encrypted video to the secure video receiving apparatus using the secure video transmission apparatus with the above-configuration will be explained.

Figure 3:
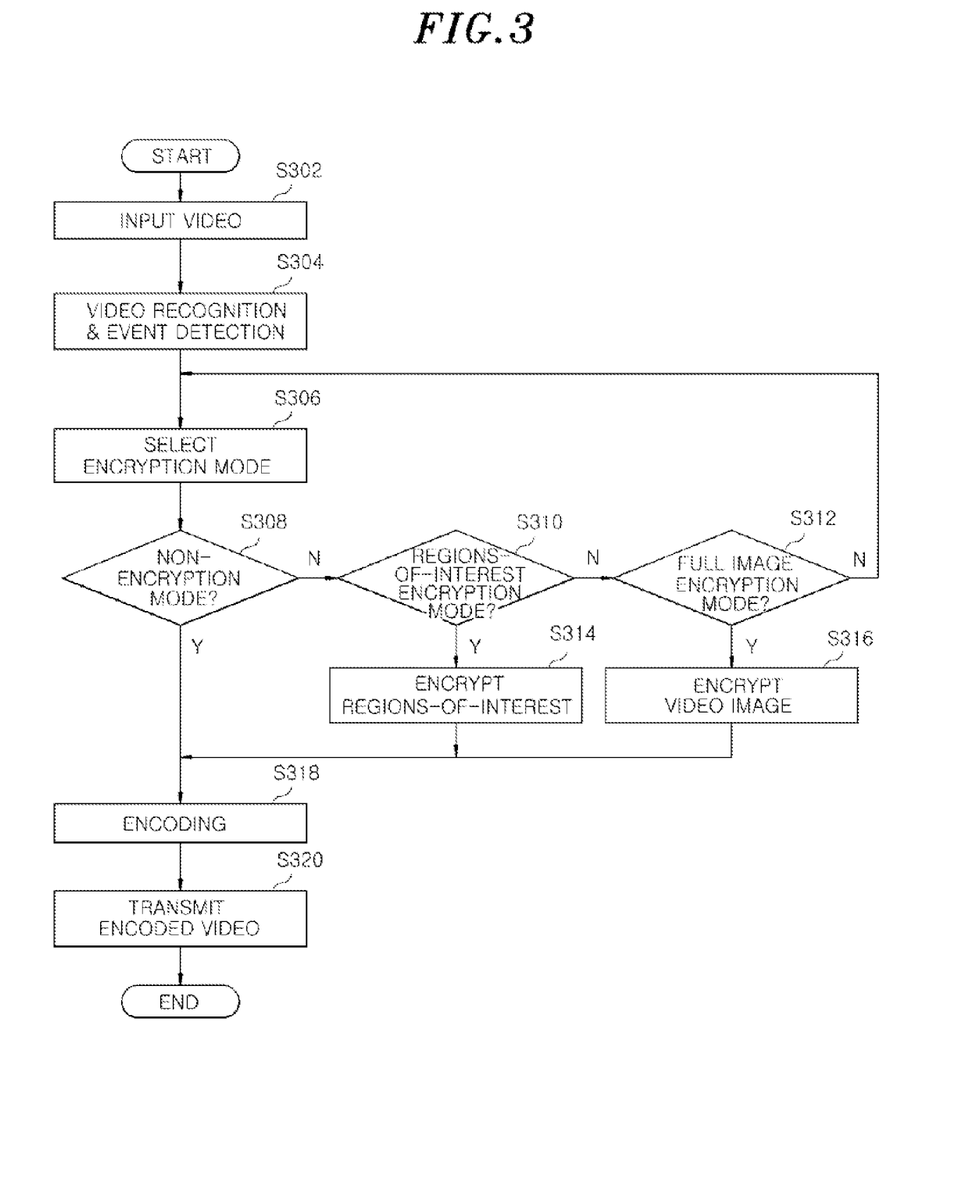
FIG. 3 is a flow chart illustrating a surveillance video transmission method, which selectively encrypts a collected video on the basis of the content of the video and transmits the selectively encrypted video, in accordance with the embodiment of the present invention.

FIG. 3 is a flow chart illustrating a surveillance video transmission method, which selectively encrypts a collected video on the basis of the content thereof and transmits the selectively encrypted video, in accordance with an embodiment of the present invention.

As shown in FIG. 3, if a video captured by a camera is input or collected in step S302, the video input unit 202 makes the input video informative and transmit same to the video analysis unit 204.

Thereafter, the video recognizer 2042 within the video analysis unit 204 recognizes whether or not a region-of-interest exists in the collected video, i.e., a region regarding private information, such as the face of person, is in the collected video. If the region-of-interest is in the collected video, the video recognizer 2042 extracts the coordinate information of the region-of-interest and transmits the coordinate information to the encryption selection unit 206 as an analysis result. Meanwhile, the event detector 2044 within the video analysis unit 204 detects the generation of an event in the collected video. If the detected resultant includes at least one of a harmful event, a violent event, an abhorrent event, a special theft, a sexual offense, violent crime and others, the event detector 2044 generates event detection information corresponding to the detection resultant and transmits the event detection information to the encryption selection unit 206 as another video analysis resultant in step S304.

Next, the encryption selection unit 206 selects one of encryption modes based on the analysis result of the collected video transmitted from the video analysis unit 204. If the analysis result indicates that the regions-of-interest do not exist in the collected video and an event is not generated, the encryption selection unit 206 selects the non-encryption mode. When the analysis result indicates that the regions-of-interest exist in the collected video but an event is not generated, the encryption selection unit 206 selects the regions-of-interest encryption mode for encrypting the regions-of-interest. Incase the analysis result indicates that at least one event exists in the collected video, the encryption selection unit 206 selects the full video encryption mode for encrypting the whole of the collected video. Further, the encryption selection unit 206 transmits the encryption mode selection information indicating the selected encryption mode to the video process unit 208 in step S306.

On the basis of the encryption mode selection information transmitted from the encryption selection unit 206, the video process unit 208 determines whether the selected encryption mode is non-encryption mode in step S308, if not, determines whether the selected encryption mode is the regions-of-interest encryption mode in step S310) and, if not, determines whether the selected encryption mode is the full video encryption mode in step S312. In other words, the video process unit 208 determines whether enables the collected video to be encoded in step S308, or determines whether only encrypts the regions-of-interest in step S310) or determines whether encrypts the whole of the collected video in step S312.

If the determined result in step S308 includes the encryption mode selection information indicating the non-encryption mode, the control process goes to step S318. Therefore, in the step S318, an encoding process is performed for the collected video which is not encrypted. In other words, in step S318, the video encoder 2084 encodes the whole of the collected video which is not encrypted.

When the checked resultant in step S310 includes the encryption mode selection information indicating the regions-of-interest encryption mode, the video encryptor 2082 within the video process unit 208 extracts the regions-of-interest from the collected video using the coordinate information of the regions-of-interest, encrypts the extracted regions-of-interest, and transmits the collected video provided with the encrypted regions-of-interest to the video encoder 2084 in step S314. As such, in step S318, the video encoder 2084 encodes the collected video including the encrypted regions-of-interest.

In case the checked resultant in step S312 includes the encryption mode selection information indicating the full video encryption mode, the video encryptor 2082 in the video process unit 208 encrypts the collected video and transmits the entirely encrypted video to the video encoder 2084 in step S316. Accordingly, in step S318, the video encoder 2084 encodes the entirely encrypted collected-video.

The only-encoded video, i.e., the encoded video without encryption, the encoded video with the encrypted regions-of-interest, or the entirely-encrypted and encoded video together with the encryption-related information are transmitted to the video transmission unit 210. In accordance therewith, the encoded video together with the encryption-related information are transmitted to the surveillance video receiving apparatus through the video transmission unit 210 in step S320. The encryption-related information may include only the encryption mode selection information, when the selected encryption mode corresponds to the non-encryption mode. If the selected encryption mode is the regions-of-interest encryption mode, the encryption-related information may include the encryption mode selection information, an encryption key, coordinates of the regions-of-interest, such as a coordinate of someone's face and on the like. In case the selected encryption mode corresponds to the full video encryption mode, the encryption-related information may include the encryption mode selection information, the encryption key.

Although the embodiment of the present has been explained in such a manner that the regions-of-interest or the whole of the collected video is encrypted before encoding the collected, the embodiment introduced here is provided only as an example for convenience of explanation and promotion of understanding. As such, the present invention is not limited to the introduced embodiment. In other words, the collected video can be encoded after encrypting the regions-of-interest or the whole of the collected video, or the encryption for the regions-of-interest or the whole of the collected video can be simultaneously performed at the encoding of the collected video by integrating the video encoder and the video encryptor.

Figure 4:
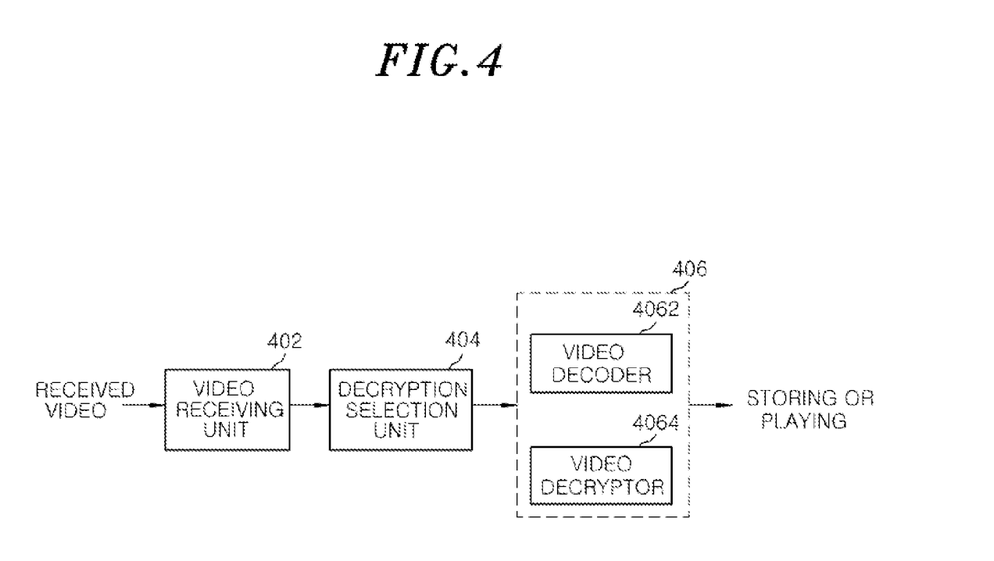
FIG. 4 is a block diagram showing the configuration of a surveillance video receiving apparatus in accordance with the embodiment of the present invention.

FIG. 4 is a block diagram showing the configuration of a surveillance video receiving apparatus in accordance with an embodiment of the present invention. The secure video receiving apparatus of FIG. 4 may include a video receiving unit 402, a decryption selection unit 404 and a video process unit 406. The video process unit 406 may include a video decoder 4062 and a video decryptor 4064.

Referring to FIG. 4, the video receiving unit 402 can demodulate the encoded video and the encryption-related information, which are transmitted from the secure video transmission apparatus of FIG. 2, into an original data format prior to transmission (or modulation). The encoded video and the encryption-related information which are demodulated by the video receiving unit 402 are transmitted to the decryption selection unit 404.

The decryption selection unit 404 can extract the encryption mode selection information in the encryption-related information transmitted from the video receiving unit 404, and select any one of a non-decryption mode, a regions-of-interest decryption mode and a full decryption mode on the basis of the encryption mode selection information. More specifically, if the encryption mode selection information indicating the non-encryption mode is extracted from the encryption-related information, the non-decryption mode for performing only a decoding process without decryption is selected. When the encryption mode selection information indicating the regions-of-interest encryption mode is extracted from the encryption-related information, the regions-of-interest decryption mode for performing the decoding process with decrypting the regions-of-interest is selected. In case the encryption mode selection information indicating the full video encryption mode is extracted from the encryption-related information, the full decryption mode for performing the decoding process without decrypting the whole of the encoded video is selected. The decryption selection unit 404 may transmit decryption mode selection information indicating the selected decryption mode to the video process unit 406.

The video process unit 406 can perform only the decoding process or with decrypting the regions-of-interest or the whole of a decoded video, based on the decryption mode selection information applied from the decryption selection unit 404. In other words, the decryption mode selection information enables the video process unit 406 to decode the encoded video, to decrypt the regions-of-interest after decoding the whole of the encoded video, or to sequentially perform the decoding and decrypting processes for the whole of the encoded video. To this end, the video process unit 406 may include the video decoder 4062 and the video decryptor 4064.

The video decoder 4062 can decode the encoded video into an original video data prior to the encoding using a previously set decoding algorithm, such as one of H.264 and MPEG video decoding algorithms.

When the regions-of-interest decryption mode is selected by the decryption selection unit 404, the video decryptor 4064 can decrypt only the encrypted regions-of-interest within the decoded video into an original data prior to the encryption, using the coordinate information of the regions-of-interest and the encryption key. Meanwhile, if the full decryption mode is selected by the decryption selection unit 404, the video decryptor 4064 can decrypt the whole of the decoded video into the original data prior to the encryption, using the encryption key. The only-decoded video or decoded and decrypted video data can be either stored into the storage medium, or played on the screen of a display device (not shown).

Processes of selectively decrypting a received video, which is selectively encrypted according to the content of the video, using the secure video receiving apparatus with the above-configuration will now be explained.

Figure 5:
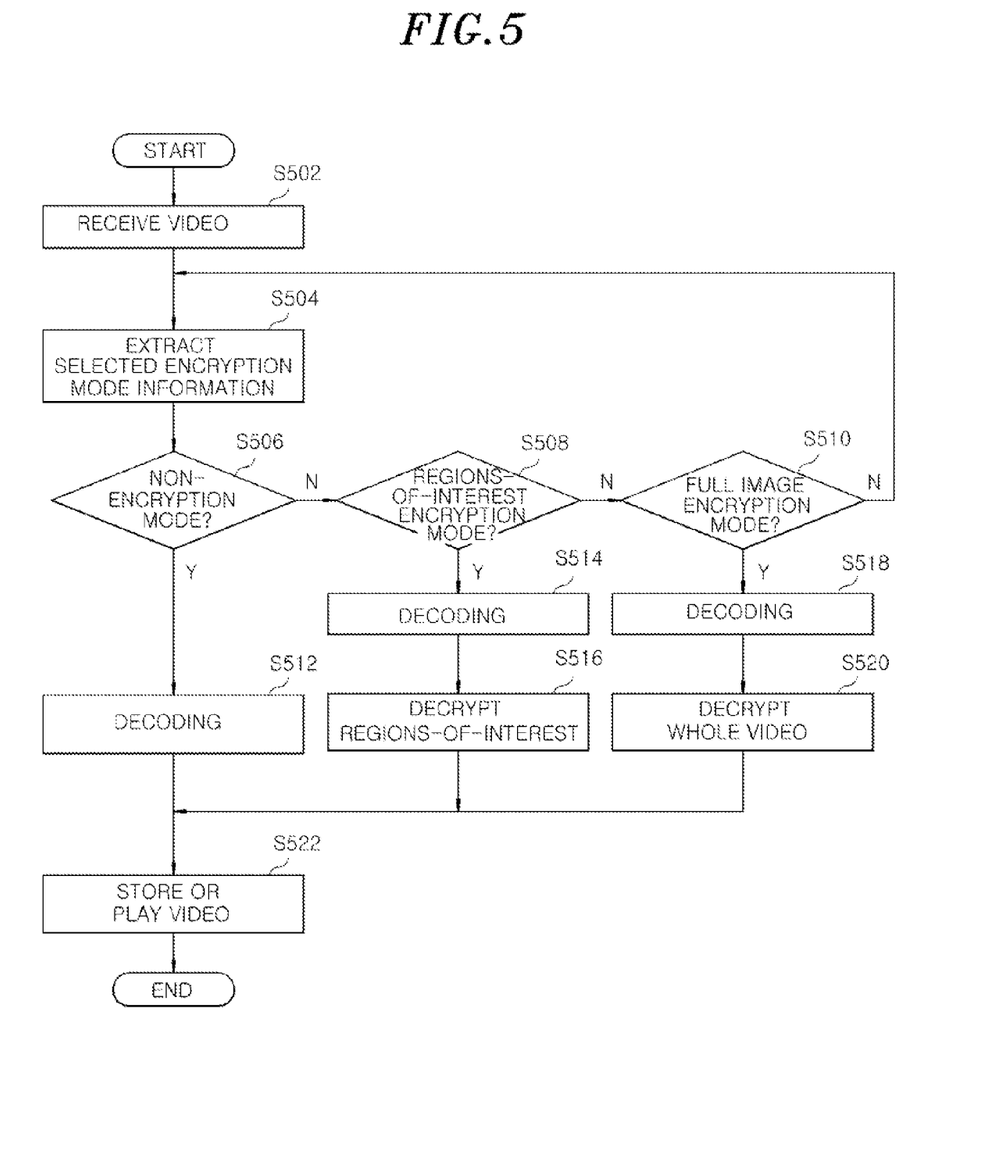
FIG. 5 is a flow chart illustrating a surveillance video receiving method, which receives and selectively decrypts a selectively encrypted video, in accordance with the embodiment of the present invention.

FIG. 5 is a flow chart illustrating a surveillance video receiving method, which receives and selectively decrypts a selectively encrypted video, in accordance with an embodiment of the present invention.

Referring to FIG. 5, the video receiving unit 402 demodulated the encoded video, which includes the encryption-related information and is received from the secure video transmission apparatus through network, into an original data prior format to modulation. The encoded video demodulated by the video receiving unit 402 is transmitted to the decryption selection unit 404 in step S502.

The decryption selection unit 404 receiving the encoded video extracts the encryption mode selection information in the encryption-related information in step S504). The decryption selection unit 404 determines whether the selected encryption mode is non-encryption mode in step S506, if not, determines whether the selected encryption mode is the regions-of-interest encryption mode in step S508 and, if not, determines whether the selected encryption mode is the full video encryption mode in step S510. In other words, decryption selection unit 404 determines whether enables the collected video to be decoded in step S512, or determines whether only decrypts the regions-of-interest in step S516 or determines whether decrypts the whole of the collected video in step S520.

If the determined result in step S506 includes the encryption mode selection information indicating the non-encryption mode, the decryption selection unit 404 selects a non-decryption mode for performing only a decoding process for the encoded video without decryption. The decryption mode selection information indicating the non-decryption mode is transmitted from the decryption selection unit 404 to the video process unit 406. As such, the video decoder 4062 in the video process unit 406 decodes the encoded video us a decoding algorithm in step S512.

When the checked resultant in step S508 includes the decryption mode selection information indicating the regions-of-interest encryption mode, the decryption selection unit 404 selects a region-of-interest decryption mode for performing the decoding process for the encoded video with decrypting the regions-of-interest. The decryption mode selection information indicating the regions-of-interest decryption mode is transmitted from the decryption selection unit 404 to the video process unit 406.

In accordance therewith, the video decoder 4062 within the video process unit 406 decodes the encoded video using the decoding algorithm in step S514. Thereafter, the video decryptor 4064 in the video process unit 406 decrypts the encrypted regions-of-interest within the decoded video into an original data state prior to encryption, using the encryption key and the coordinate information of the regions-of-interest which are extracted from the encryption-related information in step S516.

Meanwhile, the decryption selection unit 404 selects a full decryption mode for sequentially performing the decoding process and a full decryption process for the encoded video, in case the checked resultant in the step 510 includes decryption mode selection information indicating the full video encryption mode. The decryption mode selection information indicating the full decryption mode is transmitted from the decryption selection unit 404 to the video process unit 406.

The decryption mode selection information indicating the full decryption mode enables the video decoder 4062 within the video process unit 406 to decode the encoded video using the decoding algorithm in step S518. Further, the decryption mode selection information indicating the full decryption mode allows the video decryptor 4064 with the video process unit 406 to entirely decrypt the decoded video into the original data state prior to encryption, using the encryption key in step S520.

The only-decoded video or decoded and decrypted video data being obtained through the steps S512, S516 or S520 may be either stored into the storage medium, or played on the screen of a display device in step S522.

Although the embodiment of the present has been explained in such a manner that the received video is decoded before decrypting the regions-of-interest or the whole of the video when the received video corresponds to an entirely encoded video or a video provided with the encrypted regions-of-interest, the present invention is not limited to this. In other words, if the surveillance video transmission apparatus enables the collected video to be encoded after encrypting the regions-of-interest or the whole of the collected video, the present invention can be embodied to allow the received video to be decoded after decrypting the regions-of-interest or the whole of the received video. Furthermore, in case the encryption for the regions-of-interest or the whole of the collected video is simultaneously performed with the encoding of the collected video by integrating the video encoder and the video encryptor, the present invention can be realized to enable the regions-of-interest or the whole of the received video to be simultaneously performed with the decoding of the received video.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A surveillance video transmission apparatus, comprising:
   a video input unit configured to collect a physical video and make the collected physical video informative;
   a video analysis unit configured to analyze content of the collected video by recognizing the collected video,
      wherein the video analysis unit includes a video recognizer configured to recognize existence of a region-of-interest in the collected video and an event detector configured to detect generation of an event in the collected video;
   an encryption selection unit configured to select one of a non-encryption mode, a regions-of-interest encryption mode and a full video encryption mode based on the analysis result of the collected video;

a video process unit configured to perform one of a non-encryption, a regions-of-interest encryption and a full video encryption and encoding on the collected video according to the selected encryption mode; and a video transmission unit configured to transmit the encoded video and encryption-related information to a surveillance video receiving apparatus, wherein the encryption selection unit selects the non-encryption mode when the video recognizer does not recognize the existence of a region-of-interest in the collected video, selects the regions-of-interest encryption mode when the video recognizer recognizes the existence of a region-of-interest in the collected video and the event detector does not detect an event in the collected video, and selects the full video encryption mode when the event detector detects at least one event in the collected video.

2. The surveillance video transmission apparatus of claim 1, wherein the video process unit includes:

a video encryptor configured to perform one of the non-encryption, regions-of-interest encryption and full video encryption on the collected video according to the selected encryption mode; and a video encoder configured to encode a video obtained through the encryption.

3. The surveillance video transmission apparatus of claim 1, wherein the encryption-related information includes encryption mode selection information in the non-encryption mode.

4. The surveillance video transmission apparatus of claim 1, wherein the encryption-related information includes encryption mode selection information, an encryption key and coordinates of the regions-of-interest in the regions-of-interest encryption mode.

5. The surveillance video transmission apparatus of claim 4, wherein the coordinates of the regions-of-interest includes a coordinate for the face of a person in the collected video.

6. The surveillance video transmission apparatus of claim 1, wherein the encryption-related information includes encryption mode selection information and an encryption key in the full video encryption mode.

7. The surveillance video transmission apparatus of claim 1, wherein the event is a harmful event, a violent event, an abhorrent event, a special theft, a sexual offense, or a violent crime, and the region-of-interest is private information.

8. A method for transmitting surveillance video, the method comprising:

analyzing content of a collected video for the existence of a region-of-interest or an event;

selecting one of non-encryption mode, regions-of-interest encryption mode and full video encryption mode based on the analysis result of the collected video, wherein the non-encryption mode is selected when the collected video does not include a region-of-interest or an event, wherein the regions-of-interest encryption mode is selected when the collected video includes at least one region-of-interest and no events, and wherein the full video encryption mode is selected when the collected video includes at least one event;

performing a first video processing, which encodes the collected video, when the non-encryption mode is selected;

performing a second video processing, which encrypts regions in the collected video corresponding to previously set regions-of-interest and encodes the collected video including the encrypted regions-of-interest, when the regions-of-interest encryption mode is selected;

performing a third video processing procedure, which sequentially encrypts and encodes the whole of the collected video, when the full video encryption mode is selected; and transmitting the encoded video, which is obtained through one of the first through third video processing procedures, and encryption-related information to a surveillance video receiving apparatus.

9. The method of claim 8, wherein the encryption-related information includes encryption mode selection information in the non-encryption mode.

10. The method of claim 8, wherein the encryption-related information includes encryption mode selection information, an encryption key and coordinates of the regions-of-interest in the regions-of-interest encryption mode.

11. The method of claim 10, wherein the coordinates of the regions-of-interest includes a coordinate for the face of a person in the collected video.

12. The method of claim 8, wherein the encryption-related information includes encryption mode selection information and an encryption key in the full video encryption mode.

13. A surveillance video receiving apparatus comprising:

a video receiving unit configured to receive an encoded video and encryption-related information which are transmitted from a surveillance video transmission apparatus;

a decryption selection unit configured to extract encryption mode selection information from the encryption-related information and select one of non-decryption mode, regions-of-interest decryption mode and full decryption mode on the basis of the extracted encryption mode selection information; and a video process unit configured to perform one of a non-decryption, a regions-of-interest decryption and a full decryption on the encoded video according to the selected decryption mode, and store or play the decoded video, wherein the decryption selection unit selects the non-decryption mode when the encoded video does not include a region-of-interest or an event, selects the regions-of-interest decryption mode when the encoded video includes at least one region-of-interest and no events, and selects the full video decryption mode when the encoded video includes at least one event.

14. The surveillance video receiving apparatus of claim 13, wherein the decryption selection unit selects the non-decryption mode for performing the decoding of the encoded video when the encryption-related information includes the encryption mode selection information indicating a non-encryption mode.

15. The surveillance video receiving apparatus of claim 13, wherein the decryption selection unit selects the regions-of-interest decryption mode for performing the decoding of the encoded video and the regions-of-interest encryption when the encryption-related information includes the encryption mode selection information indicating a regions-of-interest encryption mode, an encryption key and coordinates of the regions-of-interest.

16. The surveillance video receiving apparatus of claim 15, wherein the coordinates of the regions-of-interest include a coordinate for the face of a person in the decoded video.

17. The surveillance video receiving apparatus of claim 13, wherein the decryption selection unit selects the full video decryption mode for performing the decoding of the encoded video and the full decryption when the encryption-related information includes the encryption mode selection information indicating a full video encryption mode, and an encryption key.

18. The surveillance video receiving apparatus of claim 13, wherein the event is a harmful event, a violent event, an abhorrent event, a special theft, a sexual offense, or a violent crime, and the region-of-interest is private information.

19. A method for receiving surveillance video, the method comprising:
receiving an encoded video and encryption-related information which are transmitted from a surveillance video transmission apparatus;
extracting encryption mode selection information from the encryption-related information and selecting one of non-decryption mode, regions-of-interest decryption mode and full decryption mode on the basis of the extracted encryption mode selection information,
wherein the non-decryption mode is selected when the collected video does not include a region-of-interest or an event,
wherein the regions-of-interest decryption mode is selected when the collected video includes at least one region-of-interest and no events, and
wherein the full video decryption mode is selected when the collected video includes at least one event; and
performing a first video processing, which decodes the collected video, when the non-decryption mode is selected;
performing a second video processing, which decodes the encoded video and decrypts regions-of-interest within the decoded video, when the regions-of-interest decryption mode is selected;
performing a third video processing, which sequentially decodes and decrypts the whole of the encoded video, when the full video encryption mode is selected; and
performing one of storing and playing on the decoded video obtained through one of the first to third video processing.

20. The method of claim 19, wherein the first video processing is performed when the encryption-related information includes the encryption mode selection information indicating a non-encryption mode;
wherein the second video processing is performed when the encryption-related information includes the encryption mode selection information indicating a regions-of-interest encryption mode, an encryption key and coordinates of the regions-of-interest; and
wherein the third video processing is performed when the encryption-related information includes the encryption mode selection information indicating a full video encryption mode, and an encryption key.

* * * * *